United States Patent [19]

Koten

[11] Patent Number: 4,863,651
[45] Date of Patent: Sep. 5, 1989

[54] COMPRESSION MOLDING METHOD

[75] Inventor: Shouichi Koten, Tokyo, Japan

[73] Assignee: Techonoplas, Inc., Tokyo, Japan

[21] Appl. No.: 624,968

[22] Filed: Jun. 26, 1984

[30] Foreign Application Priority Data

Jun. 28, 1983 [JP] Japan ................. 58-115269

[51] Int. Cl.[4] .............................. B29C 45/77
[52] U.S. Cl. ................. 264/40.5; 264/328.1; 425/149
[58] Field of Search ............ 264/40.5, 40.1, 294, 264/328.1; 425/149, 170, 555

[56] References Cited

U.S. PATENT DOCUMENTS

| 3,840,312 | 10/1974 | Paulson et al. | 425/149 |
| 3,940,465 | 2/1976 | Hauser et al. | 264/40.5 |
| 3,965,744 | 6/1976 | Gutjahr | 264/40.1 X |
| 4,060,362 | 11/1977 | Wilson, III | 425/149 |
| 4,066,725 | 1/1978 | Boetner | 264/40.5 |
| 4,349,324 | 9/1982 | Neff et al. | 425/149 |
| 4,359,435 | 11/1982 | Kogure | 264/40.5 |

FOREIGN PATENT DOCUMENTS 1270269 6/1968 Fed. Rep. of Germany .
1459673 12/1976 United Kingdom .

Primary Examiner—Jan H. Silbaugh
Assistant Examiner—Mary L. Fertig

[57] ABSTRACT

A compression molding method includes detecting actual internal die pressure of molding material filled into a mold cavity, and regulating the compressive force exerted on the molding material in the mold cavity so as to conform the detected internal die pressure with a predetermined reference internal die pressure. The compressive force exerted on the molding material is controlled by a mold clamping mechanism or an extruder in accordance with the prescribed reference internal die pressure given in the form of a waveform, thereby to keep the actual internal die pressure of the molding material in the optimum condition. Consequently, molded products of high quality can be produced continuously.

8 Claims, 3 Drawing Sheets

COMPRESSION MOLDING METHOD

BACKGROUND OF THE INVENTION

1. Field of the Invention

This invention relates to a compression molding method capable of regulating compressive force exerted on molding material filled in a mold cavity on the basis of the internal die pressure of the molding material in the mold cavity.

2. Description of the Prior Art

Molding plastic material in the molten state remarkably shrinks as it is solidified. In injection molding, in order to compensate for the shrinkage of the molding material, the capacity of a mold cavity is designed in anticipation of occurrence of the shrinkage and, in addition, the molding material in the mold cavity is forcibly compressed by a dwelling force. If the shrinkage is compensated for by utilization of the dwelling force, however, it is impossible to avoid generation of a strain in the vicinity of the gate unless a direct gate is adopted. Even if the resin pressure in the vicinity of the gate is sufficiently large, the viscosity of the molten resin is increased as the time passes and therefore, a drop in resin pressure becomes conspicuous with the movement of the molten resin in the mold cavity, thereby preventing the molten resin from maintaining a sufficiently large pressure until the mold cavity is completely filled with the resin. As a result, it is impossible to produce a uniform internal die pressure in the mold cavity. For example, a molding die having a pin gate at which molten resin is solidified quickly suffers a disadvantage that dwelling force cannot be applied to the molding material after the gate is sealed off. To eliminate this drawback, a compression molding method in which solidified resin in a mold cavity is further compressed may be applied to an injection molding machine having high productivity.

At present, compression molding machines, particularly injection compression molding machines, can be classified into two types, one in which the compressive force is produced by a molding clamping mechanism and the other in which the compression force is produced by an extruder other than the mold clamping mechanism. Of those adopting the mold clamping mechanism, there has so far been known the Rolinx process developed by Rolinx Company of England. The Rolinx process effects a mold clamping under high pressure after the mold is closed at low pressure and slightly opened by the force involved in the injection process. However, in this Rolinx process, the degree of the mold opening depends on the injection force, but the molding opening cannot be precisely controlled.

A sandwich press method which adopts a toggle type molding clamping system has been proposed by Engel Company. In the sandwich press method, the injection process is carried out while the toggle system is incompletely stretched and thereafter, compression is effected for molding material filled in the mold cavity while stretching the toggle system.

Recently, there has been developed a molding system in which the movable molding die is restricted by means of a mechanical stop to limit the movement thereof to a fixed extent.

However, the degree of shrinkage cannot be precisely regulated according to the filling condition. Consequently, sufficient compressive force cannot be used in case of a short injection short or there is a possibility that the molding die will be damaged in case of overpacking.

Further, a method using an extruder, for example a micromolding method, has been known. In this method, an oil pressure cylinder is used in addition to the mold clamping mechanism and the resin filled in the mold cavity is compressed by the oil pressure cylinder. However, the micromolding method requires an oil pressure cylinder of a large size to the extent of ignoring injection pressure and moreover, the molding die is restricted as to its construction. Besides, this known method has suffered a disadvantage that the degree of mold opening depends on injection pressure and cannot be precisely controlled.

What should be noteworthy is the fact that the filling conditions cannot constantly be maintained and varies with every injection shot. The shrinkage condition of the molding materials is affected by the filling condition and depends on the molding conditions such as the temperature of the molding die and the oil pressure in the compression system. Furthermore, these molding systems are influenced by various disturbances with the result that the molding conditions described above cannot be constantly maintained and the shrinkage of the molding material filled in the mold cavity can not be kept at a constant state. If a fixed compressive pressure is applied to the molten resin in the mold cavity at all times, the reproducibility is reduced unless the shrinkage state of the molding material is taken into account.

All the injection molding methods hereinbefore described utilize a fixed compressive pressure applied to the molding material filled in the mold cavity, and therefore they cannot regulate the compressive force in proportion to the shrinkage of the molding material.

Now, what does matter at this point is the view point from which the filling condition of molding material and the shrinkage state thereof are viewed. The inventor of this invention has taken note of the resin pressure which is considered to be a function of the plastic and has succeeded in deriving the internal die pressure from the resin pressure continuously detected in the resin passageway of a molding die as proposed in Japanese Patent Application Public Disclosure Sho. 52(1977)-14658. The internal die pressure is detected by a sensor disposed in the resin passageway of the molding die and expressed as a waveform representing the condition under which the molding material is filled into the mold cavity and shrunk throughout the molding shot from the filling process to the dwelling process.

Therefore, the variation of the shrinkage state of the molding material can be viewed as a variation of the internal die pressure of the molding material filled in the mold cavity.

OBJECT OF THE INVENTION

An object of this invention is to provide a compression molding method which enables the internal die pressure of a molding material filled into a molding cavity to be maintained in the optimum condition every molding shot, thereby to continuously produce molded products of high quality with a high accuracy.

SUMMARY OF THE INVENTION

In order to achieve the object described above, the compression molding method according to this invention comprises detecting the internal die pressure of a molding material filled into a mold cavity, and regulating the compressive force exerted on the molding material in the mold cavity so as to conform the changes of the detected internal die pressure with the reference internal die pressure which is predetermined.

The internal die pressure is actually detected by a sensor disposed in a resin passageway and compared with the prescribed reference internal die pressure given as a waveform, so that the compressive force exerted on the molding material in the mold cavity can be regulated to maintain the actual internal die pressure in the optimum condition. Consequently, molded products of high quality can be continuously produced with a high accuracy.

BRIEF EXPLANATION OF THE DRAWINGS

Other objects and features of the present invention will be apparent from the ensuing detailed description in connection with the accompanying drawings, wherein.

DESCRIPTION OF THE PREFERRED EMBODIMENT

Figure 1:
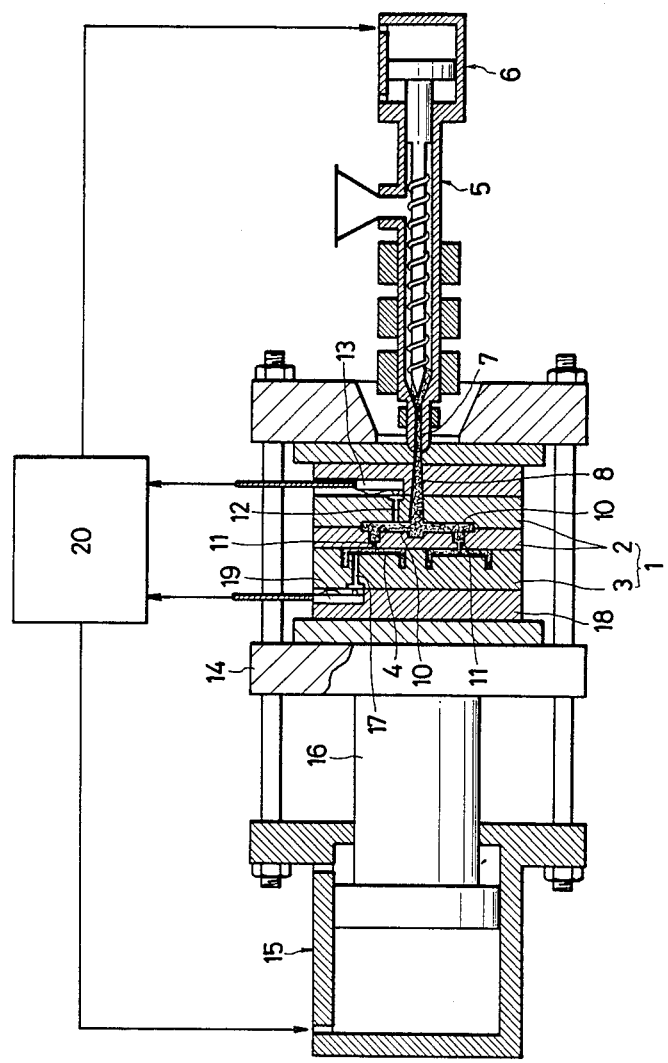
FIG. 1 is a schematic diagram of one preferred embodiment of an injection compression molding machine to which the present invention is applied.

Referring to FIG. 1, the injection compression molding machine according to this invention comprises a molding die 1 which is constituted by a fixed retainer plate 2 and a movable retainer plate 3 which are brought into contact with each other to define a mold cavity 4 therebetween. Into the mold cavity 4, molding resin material in the molten state is injected from a nozzle 7 of an injection mechanism 6 of an injection system 5 through a sprue 8, a runner 10 and a pin gate 11. A pressure detecting pin 12 extends through the fixed retainer plate 2 in such a way that the inner end thereof extends to the runner 10 and the outer end thereof is brought into contact with a pressure sensor 13. By means of the pressure detecting pin 12, the internal die pressure of the molding material passing through the runner 10 serving as a resin passageway is detected.

The movable retainer plate 3 is held in position by a movable die plate 14 and pressed against the fixed retainer plate 3 through the movable die plate 14 by means of a mold clamping ram 16 of a mold clamping mechanism 15.

Another pressure detecting pin 17 extends through the movable retainer plate 3 in such a way that the inner end thereof extends to the mold cavity 4 and the outer end thereof is brought into contact with a pressure sensor 19 which is disposed in the movable retainer plate 18 on the movable die plate side and serves to detect the internal die pressure of the molding material filled in the mold cavity.

Figure 2:
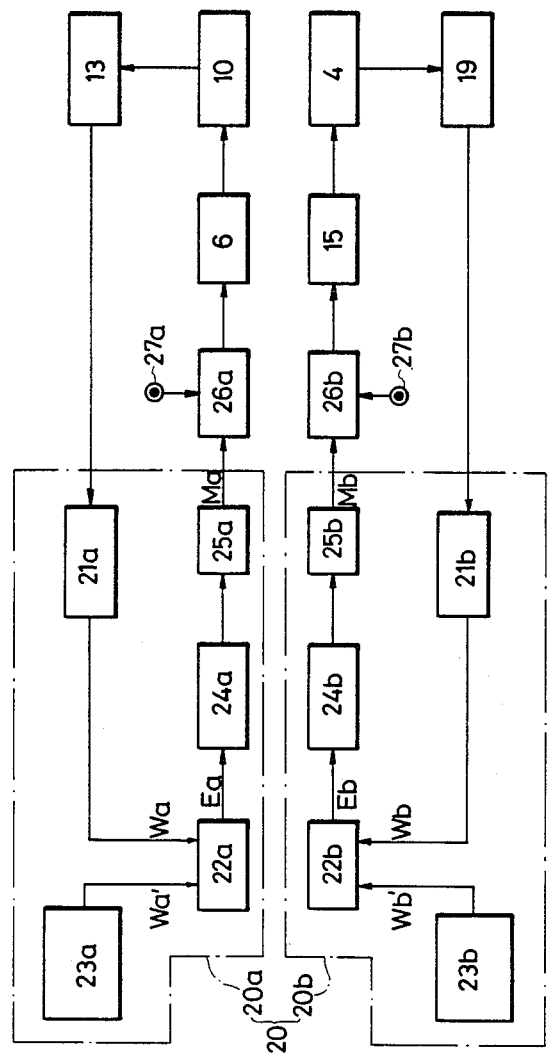
FIG. 2 is a block circuit diagram of a control system for regulating compressive force in conformity with a reference internal die pressure according to the present invention.

Denoted by 20 is a closed loop control system which functions to compare the respective internal die pressures detected by the pressure sensors 13 and 19 with the corresponding reference waveforms of internal die pressure which are previously determined and gives a control signal as a feedback signal obtained as the result of the comparison of the detected internal die pressures with the reference waveforms to a servo system for driving the injection mechanism 6 and the mold clamping system 15. This closed loop control system 20 is, as illustrated in FIG. 2, is composed of an injection control unit 20a adapted to control the injection mechanism 6 in accordance with a serial pressure signal fed from the pressure sensor 13 for detecting the internal die pressure of the molding material passing through the runner, and a compression control unit 20b adapted to control the mold clamping mechanism 15 in accordance with a pressure signal fed serially from the pressure sensor 19 for detecting the internal die pressure of the molding material in the mold cavity.

In the injection control unit 20a, the internal die pressure Wa of the molding material which passes through the runner 10 to go into the mold cavity 4 is detected as a serial pressure signal and is inputted to a comparator 22a through an amplifier 21a and at the same time, the prescribed waveform Wa' of reference internal die pressure which is previously set in an internal die pressure setting circuit 23a is supplied to the comparator 22a. With this comparator, the detected internal die pressure Wa is compared with the prescribed reference internal die pressure Wa' to obtain and output differential pressure signal Ea to a controller 24a. Control signal Ma to be fed from the controller 24 to a servovalve driving system 26a via an amplifier 25a corresponds to the manipulated variable for controlling a servovalve. According to the manipalated variable, the servovalve is controlled to supply the desired quantity of pressure oil from a pressure oil source 27a to a cylinder of the injection system 6 so that the detected internal die pressure Wa agrees with the reference internal die pressure Wa' given as a waveform.

On the other hand, in the compression control unit 20b, the internal die pressure Wb of the molding material filled in the mold cavity 4 is detected by the sensor 19 and fed as corresponding signal to a comparator 22b via an amplifier 21b. The detected internal die pressure Wb is compared with reference internal die pressure Wb' which is previously supplied in the form of a waveform to deliver differential pressure signal Eb to a controller 24b. The controller 24b produces control signal Mb according to the differential pressure signal Eb from the comparator 22b and gives the signal Mb to a servovalve driving system 26b via an amplifier 25b, thereby operating a servovalve so as to supply the desired quantity of pressure oil from a pressure oil source 27b to a cylinder of the molding clamping system 15. As a result, compressive force is exerted on the molding resin material in the mold cavity.

The reference internal die pressures Wa' and Wb' which are previously set as desired values in the form of a waveform in the respective internal die pressure setting circuits 23a and 23b of the injection and compression control system 20a and 20b are determined by repeatedly carrying out experimental molding shots and sampling internal die pressure data when molded products of high quality are obtained. The sampled data representing conforming articles are programmed in the corresponding setting circuits 23a and 23b in the form of a waveform together with control timing data for injection and compression.

Figure 3:
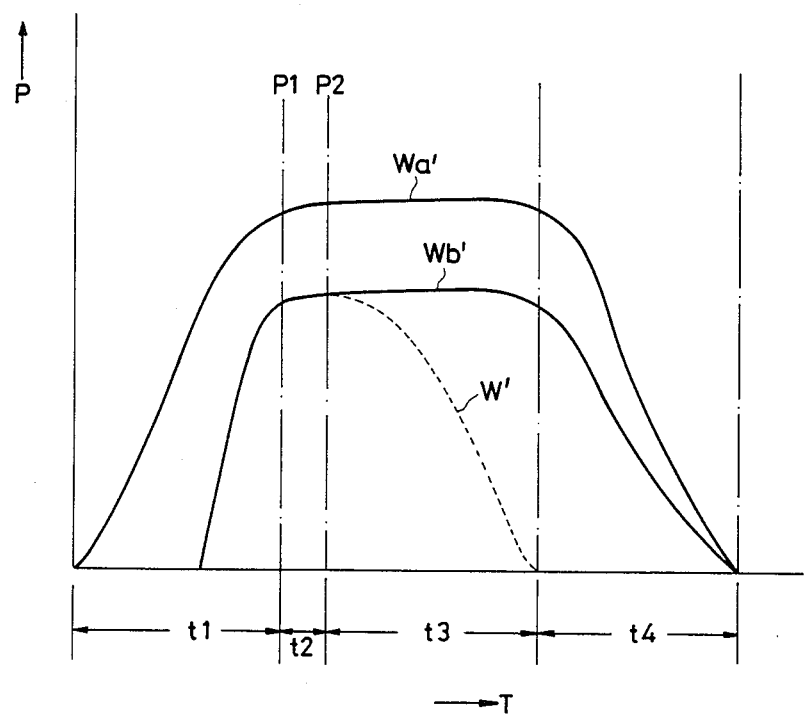
FIG. 3 is a graph showing one example of the prescribed reference waveform of the internal die pressure.

Now, the internal die pressure will be explained with reference to FIG. 3 illustrating one example of the time-pressure (T-P) characteristics. When the molding resin material is injected into the mold cavity 4 in the period of time t1 by the injection system 5 and then, reaches the runner 10, it is detected in terms of internal die pressure and the filling condition of the molding material passing through the runner 10 is expressed as the waveform Wa' of the internal die pressure in the runner. In the filling process, the injection mechanism 6 is controlled so as to conform the actual internal die pressure detected in the runner 10 with the reference internal die pressure Wa' which is previously given in the form of a waveform. Likewise, the internal die pressure Wa' peaks at the point P1 when the mold cavity is completely filled with the molding material and therefore, the closed loop control system should be controlled so as to conform the detected internal die pressure closely with the reference internal die pressure just before the pressure reaches the peak in the injection process.

The feedback control is not necessarily carried out in the rising period at the outset of the injection process, and in this case, the detected internal die pressure just before the peak point may be subjected to the feedback control. In the meantime, the internal die pressure Wb' in the mold cavity is not detected until the filling of the molding material into the mold cavity is nearly completed, and however, it rapidly reaches the peak P1 after being detected.

At the end of the period of time t2, the internal die pressure reaches the gate seal point P2. In the period of time t2, the injection mechanism 6 is regulated on the basis of the reference internal die pressure Wa' of the resin in the runner.

Thereafter, the molding material begins to solidify. However, the internal die pressure in the mold cavity gradually descends due to the shrinkage of the molding material which is caused by the solidification of the molding material as indicated by the dotted line (W') in FIG. 3 unless mold clamping force or extrusion force is applied to the molding material in the mold cavity 4, resulting in the sink and strain of the molded product. Thus compression force is forcibly applied to the molding material in the mold cavity to obtain the desired internal die pressure on the basis of the reference internal die pressure Wb' given in the form of a waveform in the regular period of time t3 as illustrated in FIG. 3. The internal die pressure waveforms Wa' and Wb' are obtained by repeatedly making experimental molding shots and previously set in the respective setting circuits 23a and 23b.

The closed loop feedback control in the embodiment described above is carried out on the basis of not only the reference internal die pressure Wa' in the runner but also the reference internal die pressure Wb' in the mold cavity. Therefore, the compression molding method so far described has advantages that the amount of molding material to be filled into the mold cavity can be precisely determined and that complete molding can be accomplished in immediate response to the filling condition and the shrinkage state of the molding material.

Although the internal die pressure in the illustrated embodiment is kept under control on the basis of the prescribed reference waveform Wa' before the gate seal point P2, the gate seal point may be arbitrarily determined. In the case where, for example, a molding die having a forced gate seal mechanism is used, compressive force can be regulated on the basis of the reference internal die pressure Wb' in the mold cavity after the actual internal die pressure reaches the peak point P1. In this case, it is possible to eliminate the stress concentration caused by the gate in the period of time t2 and effectively disperse the stress produced in the vicinity of the gate in the filling process before the molding material is solidified.

Further, the aforementioned embodiment adopts the regular compressive force based on the reference internal die pressure Wb' in the mold cavity; nevertheless, it is not specifically limited to this arrangement. That is to say, compressive force in this invention can be arbitrarily controlled from the rising of the internal die pressure in the period of time t1 to the end of the period of time t4 in accordance with the kind of resin to be used, the construction of the molding die, various molding conditions and so on.

Also in the aforementioned embodiment, the filling of the molding material into the mold cavity is usually under the control of the internal die pressure of the molding material passing through the resin passageway. However, the control of the internal die pressure is not the constitutive factor of the present invention. As far as the mold cavity is precisely filled with the molding material of a fixed quantity, the compression molding method of the present invention can be used jointly with a transfer molding method, for example.

The, molding material may of course be any kind including of synthetic resin.

As is clear from the description given above, according to the present invention, the internal die pressure of molding material filled into the mold cavity can be kept at the optimum condition during every molding shot by regulating the compressive force exerted on the molding material so as to confrom the actual internal die pressure detected in the mold cavity with a reference internal die pressure given previously in the form of a waveform, thereby to enable molded products of a high quality to be continuously produced with high accuracy.

Furthermore, if an extruder for urging the movable retainer plate toward the molding die is used instead the mold clamping mechanism disclosed in this embodiment and controlled by the closed loop control system, this method provides the same effect and can used in a wide variety of applications to any existing injection molding machine.

What is claimed is:

1. A compression molding method in which molding material is injected and filled into a mold cavity through a runner and subsequently compressed by a molding material compressive force in the mold cavity separate from the injection pressure, which method comprises the steps:

predetermining a desired reference internal pressure in the runner leading into the mold cavity, said desired reference internal pressure being in the form of a waveform;

continuously detecting the actual internal pressure of the molding material passing through the runner;

continuously comparing the actual internal pressure thus detected in the runner with the said predetermined desired reference internal pressure in the runner;

continuously regulating the injection pressure so as to conform the detected internal pressure in the runner with said predetermined desired reference internal pressure in the runner;

predetermining a desired reference internal die pressure of the molding material filled into the mold cavity, said desired reference internal die pressure being in the form of a waveform;

continuously detecting the actual internal die pressure of the molding material filled into the mold cavity;

continuously comparing the actual internal die pressure thus detected in the mold cavity with said predetermined desired reference internal die pressure; and continuously regulating the compressive force by which the molding material filled in the mold cavity is compressed so as to conform said detected actual internal die pressure of the molding material filled into the mold cavity with said predetermined desired reference internal die pressure.

2. A method according to claim 1 wherein the steps of comparing the actual internal die pressure and regulating the compressive force exerted on the molding material in the mold cavity comprises using a closed loop control system for comparing the detected internal die pressure in the mold cavity with the predetermined desired reference internal die pressure of the mold cavity, regulating the compressive force, and feeding back the result of said regulating to said comparing step.

3. A method according to claim 1, wherein the compressive force exerted on the molding material filled into the mold cavity is produced by operating a mold clamping mechanism with reference to the predetermined desired reference internal die pressure of the mold cavity.

4. A method according to claim 1, wherein the compressive force to be exerted on the molding material filled in the mold cavity is produced by an extruder with reference to the predetermined desired reference internal die pressure of the mold cavity.

5. A method according to claim 1 wherein the steps of comparing the actual internal pressure in the runner and regulating the injection pressure comprises using a further closed loop control system for comparing the detected internal pressure in the runner with the predetermined desired reference internal pressure in the runner, regulating the injection pressure, and feeding back the result of said regulating to said comparison step.

6. A compression molding method in which molding material is injected and filled into a mold cavity through a runner in a filling process and subsequently compressed in a compression process by a compressive force brought about in the mold cavity by means of a mold clamping mechanism, which method comprises the steps of:

predetermining a desired reference internal pressure in the runner leading into the mold cavity, said desired reference internal pressure being in the form of a waveform;

detecting actual internal pressure of the molding material passing through the runner;

comparing the actual internal pressure thus detected in the runner with the said predetermined desired reference internal pressure in the runner by use of a first closed loop control system for comparing the detected actual internal pressure in the runner with the predetermined desired reference internal pressure of the runner;

regulating injection pressure under which the molding material is filled in the mold cavity so as to conform the detected internal pressure in the runner with said predetermined desired reference internal pressure in the runner by use of said first closed loop system;

feeding back the result of said regulating step of the injection pressure to said comparing step of the internal pressure of the runner;

predetermining a desired reference internal die pressure of the molding material filled into the mold cavity, said desired reference internal die pressure being in the form of a waveform;

detecting actual internal die pressure of the molding material in the mold cavity;

comparing the actual internal die pressure thus detected in the mold cavity with said predetermined desired reference internal die pressure by use of a second closed loop control system for comparing the detected actual internal die pressure in the mold cavity with the predetermined desired reference internal die pressure of the mold cavity;

regulating the compressive force by which the molding material filled in the mold cavity is compressed so as to conform said detected actual internal die pressure of the molding material filled in the mold cavity with said predetermined desired reference internal die pressure by use of said second closed loop control system; and feeding back the result of said regulating step of the compressive force to said comparing step of the internal die pressure of the molding material in the mold cavity.

7. A method according to claim 6, wherein the compressive force exerted on the molding material filled into the mold cavity is produced by operating the mold clamping mechanism with reference to the predetermined desired reference internal die pressure of the mold cavity.

8. A method according to claim 6, wherein the compressive force to be exerted on the molding material filled in the mold cavity is produced by an extruder with reference to the predetermined desired reference internal die pressure of the mold cavity.

* * * * *